(12) United States Patent
Klopcic et al.

(10) Patent No.: US 8,339,822 B2
(45) Date of Patent: Dec. 25, 2012

(54) METHOD AND DEVICE FOR OPERATING A TRANSFORMER

(75) Inventors: Beno Klopcic, Ljubliana-Crnuce (SI); Heinz-Ullrich Mueller, Michelstadt (DE); Drago Dolinar, Maribor (SI); Gorazd Stumberger, Ptuj (SI)

(73) Assignee: Robert Bosch GmbH, Stuttgart (DE)

( * ) Notice: Subject to any disclaimer, the term of this patent is extended or adjusted under 35 U.S.C. 154(b) by 751 days.

(21) Appl. No.: 12/442,914

(22) PCT Filed: Jun. 26, 2007

(86) PCT No.: PCT/EP2007/005624
§ 371 (c)(1),
(2), (4) Date: Sep. 21, 2009

(87) PCT Pub. No.: WO2008/037304
PCT Pub. Date: Apr. 3, 2008

(65) Prior Publication Data
US 2010/0039206 A1    Feb. 18, 2010

(30) Foreign Application Priority Data

Sep. 27, 2006  (DE) .................. 10 2006 045 970

(51) Int. Cl.
*H02M 3/335* (2006.01)
*H02M 7/537* (2006.01)
(52) U.S. Cl. .......................... 363/98; 363/17
(58) Field of Classification Search .............. 363/95, 363/97, 98, 131, 132, 15, 16, 17; 219/108, 219/109, 114, 117.1, 130.32
See application file for complete search history.

(56) References Cited

U.S. PATENT DOCUMENTS

| 3,317,811 | A | 5/1967 | Normando et al. |
| 3,688,181 | A | 8/1972 | Leep et al. |
| 4,418,267 | A | 11/1983 | Pfanzelt |
| 4,897,773 | A | 1/1990 | Bilczo |
| 5,844,193 | A * | 12/1998 | Nomura et al. ............... 219/110 |
| 6,414,267 | B1 | 7/2002 | Reynolds et al. |
| 7,262,978 | B2 * | 8/2007 | Yamada .......................... 363/40 |
| 2005/0276085 | A1 | 12/2005 | Winn |

FOREIGN PATENT DOCUMENTS

| CH | 382 322 | 9/1964 |
| GB | 384 914 | 12/1932 |
| GB | 1 127 115 | 9/1968 |

OTHER PUBLICATIONS

Karavaev V.T:"A Transformer for Arc Welding . . . " Welding International, Woodhead Publishing Limited, Cambridgeshire, GB, vol. 15, No. 9, 2001, pp. 716-718.

* cited by examiner

*Primary Examiner* — Gary L Laxton
(74) *Attorney, Agent, or Firm* — Michael J. Striker

(57) ABSTRACT

A method for operating a single-phase, mid-frequency welding transformer formed with a transformer core having a primary coil and a secondary coil connected into a secondary circuit has several steps. The several steps include regulating a magnetic flux density (B) in the transformer core between an upper flux density threshold value (Bm) and a lower flux density threshold value (−Bm), by applying, in alteration, a first voltage ($U_{DC}$) and a second voltage ($-U_{DC}$) to the primary coil of the transformer, and regulating a load current ($i_{br}$) in the secondary circuit between an upper load current threshold value ($i_{br-zg}$) and a lower load current threshold value ($i_{br-sp}$), by applying, in alternation, a third voltage (0V) to the primary coil of the transformer.

5 Claims, 3 Drawing Sheets

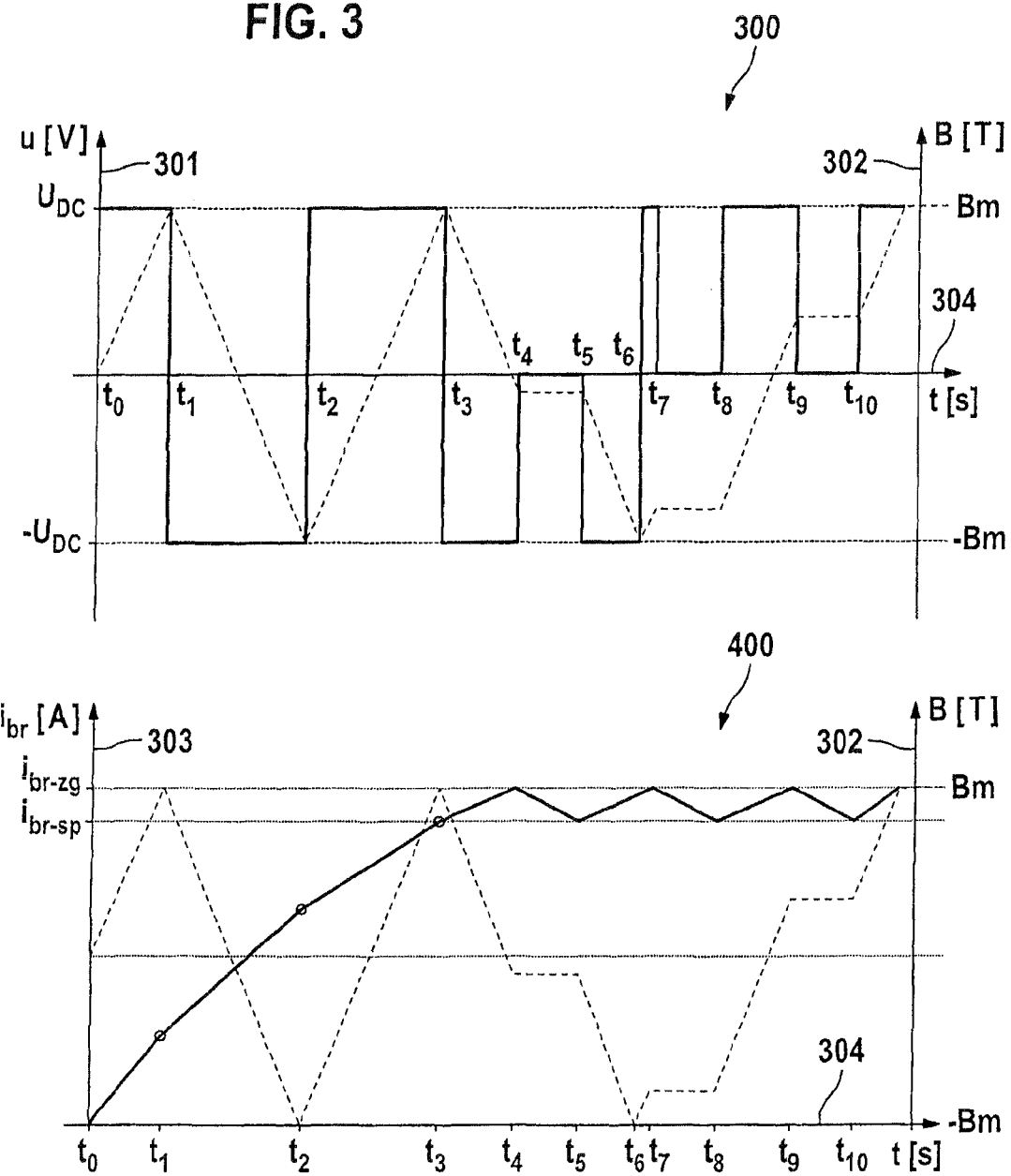

METHOD AND DEVICE FOR OPERATING A TRANSFORMER

The present invention relates to a method and a device for operating a transformer, in particular a (single-phase) mid-frequency welding transformer that includes a transformer core having a primary coil and a secondary coil. The present invention also relates to an appropriate computer program and an appropriate computer program product.

BACKGROUND INFORMATION

Although reference is made below essentially to mid-frequency welding transformers, the present invention is not limited thereto.

Mid-frequency transformers have been used for some time in welding methods. They are typically supplied by an inverter having a square-wave ac voltage in the range of a few kHz and a few hundred volts. The transformer outputs, to its secondary coil, a low voltage with a high current which is then rectified and used for the welding process. The high frequency with which the mid-frequency transformers are operated makes it possible to convert energy efficiently and, therefore, to use a relatively small and lightweight transformer. During operation, however, hysteresis, saturation effects, and current spikes occur, which influence the energy transfer and may have a damaging effect on components.

It is known to diminish current spikes to a partial extent by connecting diodes together in pairs. Specially selected diodes must be used for this purpose, which results in higher manufacturing and repair costs.

It is also known to diminish saturation effects via special programming of transformer controllers or a device for operating a transformer. The disadvantage of this solution is that programming of this type may only ever be used for a certain type of transformer, thereby making it necessary to employ a greater amount of programming effort when the aim is to improve various types of transformers.

The object, therefore, is to provide a method and a device for operating a transformer, which do not have the disadvantages stated above, i.e., in particular, they shorten the rise time of the input current and diminish a magnetic saturation in the transformer core and current spikes in the output current.

This object is attained via a method and a device for operating a transformer having the features of the independent claims. Advantageous embodiments are the subject matter of the subclaims and the description that follows.

ADVANTAGES OF THE INVENTION

The features and advantages described below relate to the method according to the present invention and to the device according to the present invention, unless explicitly described otherwise.

The method according to the present invention for operating a transformer, in particular a (single-phase) mid-frequency welding transformer that includes a transformer core having a primary coil and a secondary coil that is connected into a secondary circuit includes the regulation of a magnetic flux density in the transformer core between an upper flux density threshold value and a lower flux density threshold value, and the regulation of a load current in the secondary circuit between an upper load current threshold value and a lower load current threshold value. In the regulation, the flux density actual value or the load current actual value is advantageously detected as a controlled variable, and it is adapted to the particular expected value as a guide variable. In particular, the processes described are typically repeated for as long as the transformer is operated, e.g. during a welding process. Using the solution according to the present invention, it is possible to significantly improve the performance of a transformer. In particular, saturation effects and current spikes are prevented, and the rise time of the load current is shortened. This solution may be implemented easily in existing systems. New transformers to be developed may be made smaller in size due to the improved performance, thereby resulting in lower weight and lower costs.

Advantageously, the regulation of the magnetic flux density in the transformer core between the upper flux density threshold value and the lower flux density threshold value is accomplished by applying, in alternation, a first voltage and a second voltage to the primary coil of the transformer It is particularly easy to regulate the magnetic flux density in the transformer core. In the case of mid-frequency transformers in particular, the magnetic flux density behaves largely proportionally to the course of applied square-wave voltage over time, with the corresponding polarity. For example, the magnetic flux density may be increased by applying a positive dc voltage, and it may be diminished by applying a negative dc voltage.

It is also advantageous when the regulation of the load current in the secondary circuit between the upper load current threshold value and the lower load current threshold value is accomplished by applying, in alternation, a third voltage and a fourth voltage to the primary coil of the transformer. In the case, in particular, of mid-frequency transformers that include a downstream rectifier, the rectified load current in the secondary current behaves in a manner such that a rise in the load current takes place for as long as a voltage is present at the transformer, while the rectified load current falls when no voltage is present at the transformer. In this manner, it is possible to easily regulate the load current simply by switching only two voltages.

Advantageously, the first and the second voltages are direct voltages that are essentially of the same magnitude and opposite polarity, the third voltage is essentially zero, and the fourth voltage is the first or second voltage. In this manner, the method may be used particularly easily, in particular, to operate mid-frequency transformers, since essentially only three voltages or one voltage having positive and negative polarity, and no voltage are applied, which is made possible by providing switching means having a simple design.

A device according to the present invention includes, in particular, means for carrying out a method according to the present invention. The method according to the present invention for operating a transformer, in particular a (single-phase) mid-frequency welding transformer that includes a transformer core having a primary coil and a secondary coil that is connected into a secondary circuit includes a first determination device for a magnetic flux density in the transformer core, a second determination device for a load current in the secondary circuit, a first comparator unit for comparing the magnetic flux density that was determined with at least one flux density threshold value, and a second comparator unit for comparing the load current that is determined with at least one load current threshold value. Moreover, the device according to the present invention includes a control device for controlling switching means based on the comparisons, wherein the switching means includes first connections for a voltage source, and second connections for the primary coil of the transformer, and which is designed to apply a first, second, third, or fourth voltage to the primary coil of the transformer. A "determination device" is understood to mean, in particular, a measuring device, e.g. a sensor and a measuring device.

Likewise, an arithmetic logic unit may be provided as the determination device, which calculates or estimates the, e.g. magnetic flux density and/or the load current based on the course of applied voltage over time, and based on other parameters. A device of this type is particularly easy to manufacture and proves in practice to be particularly robust and reliable, due to the relatively low number of components involved. For the rest, reference is made in this context to the advantages described in conjunction with the method according to the present invention.

Advantageously, the device includes the switching means and/or the voltage source.

It is advantageous when the first and second voltages are dc voltages that are essentially of the same magnitude and opposite polarity, the third voltage is essentially zero, and the fourth voltage is the first or second voltage. The advantages described in conjunction with the method according to the present invention apply here as well. In particular, it is sufficient to connect a dc voltage source to the device or the switching means in order to operate a transformer using essentially three voltages ("plus", "minus", and "zero") according to the method per the present invention.

It is advantageous when the device according to the present invention includes a dc voltage source for supplying a first dc voltage which is connected to the switching means. A device of this type may typically be designed as a welding device, wherein the dc voltage source is designed, e.g. as a mains-supplied, controlled rectifier. In this example, the switching means essentially corresponds to a controlled inverter. In this manner, a welding device may be provided that includes all of the advantages of the solution according to the present invention.

The computer program according to the present invention includes program code means for implementing all steps of a method according to the present invention when the computer program is run on a computer or an appropriate arithmetic logic unit, in particular on an arithmetic logic unit according to the present invention.

A computer program product or a microprocessor program product according to the present invention includes program code means which are stored on a computer-readable data storage device for carrying out all steps of a method according to the present invention when the program product is run on a computer, a microprocessor, or an appropriate arithmetic logic unit. Suitable data storage devices are, in particular, diskettes, hard drives, ROM, Flash drives, EEPROMs, CD-ROMs, etc. It is also possible for a program to be downloaded from computer networks (Internet, intranet, etc.), vehicle networks (body bus, infotainment bus, etc.), or air interfaces (mobile communication system).

Further advantages and embodiments of the present invention result from the description and the attached drawing.

It is understood that the features mentioned above and which are described below may be used not only in the combination described, but also in other combinations or alone, without leaving the scope of the present invention.

The present invention is depicted schematically with reference to an embodiment in the drawing, and it is described in detail below with reference to the drawing.

DESCRIPTION OF THE FIGURES

FIG. 3 shows, schematically, the correlation between the voltage applied to the primary coil, the magnetic flux density in the transformer core, and the load current in the secondary circuit.

Figure 1:
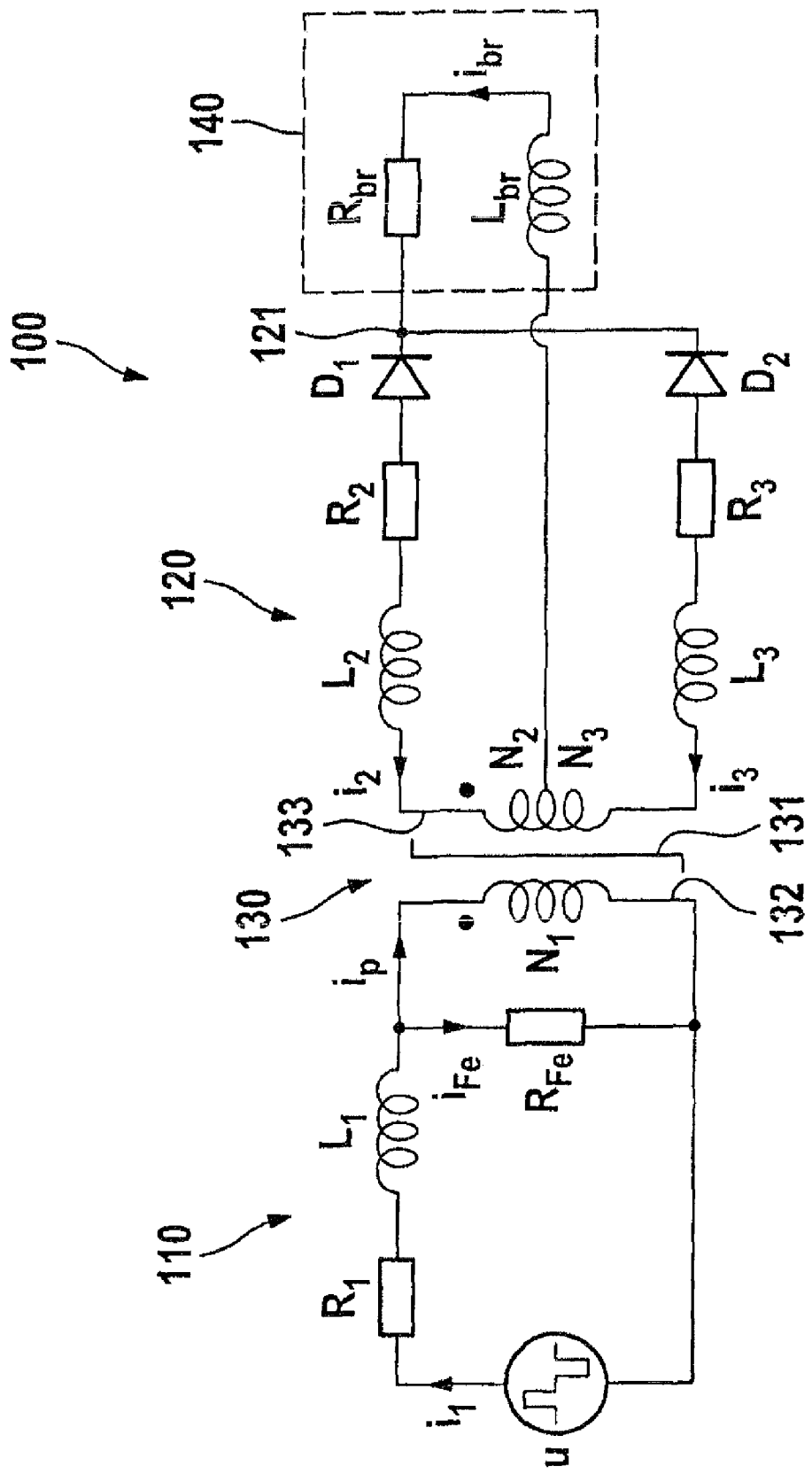
FIG. 1 shows a schematic view of a mid-frequency welding device.

A mid-frequency welding system is shown schematically in sections in FIG. 1, and it is labelled as a whole with reference numeral 100. System 100 may be subdivided into various components. It includes a primary circuit 110 and a secondary circuit 120, which are connected via a transformer 130. A primary coil 132 of transformer 130 having $N_1$ number of turns is connected into primary circuit 110, and a secondary coil 133 of transformer 130 having $N_2+N_3$ number of turns is connected into secondary circuit 120. Transformer 130 also includes a transformer core 131.

In secondary circuit 120, an output region is labeled with reference numeral 140; output region represents a welding load. Various resistors which are labeled R, inductances which are labeled L, diodes which are labeled D, and currents which are labeled i, all as they are understood by a person skilled in the art, are shown in FIG. 1. Moreover, a voltage source u which supplies high-frequency ac voltage to the primary circuit is provided in primary circuit 110.

Secondary circuit 120 is designed partially as a rectifier, which results in a rectified load current $i_{br}$ between a mid-tap of second coil 133 and a connection point 121.

The square-wave voltage at the input of the transformer causes a triangular magnetizing current which is approximately independent of the secondary current. The magnetizing current is approximately proportional to the magnetic flux or the magnetic flux density. The magnetic flux density in the transformer core is determined by the input voltage.

Figure 2:
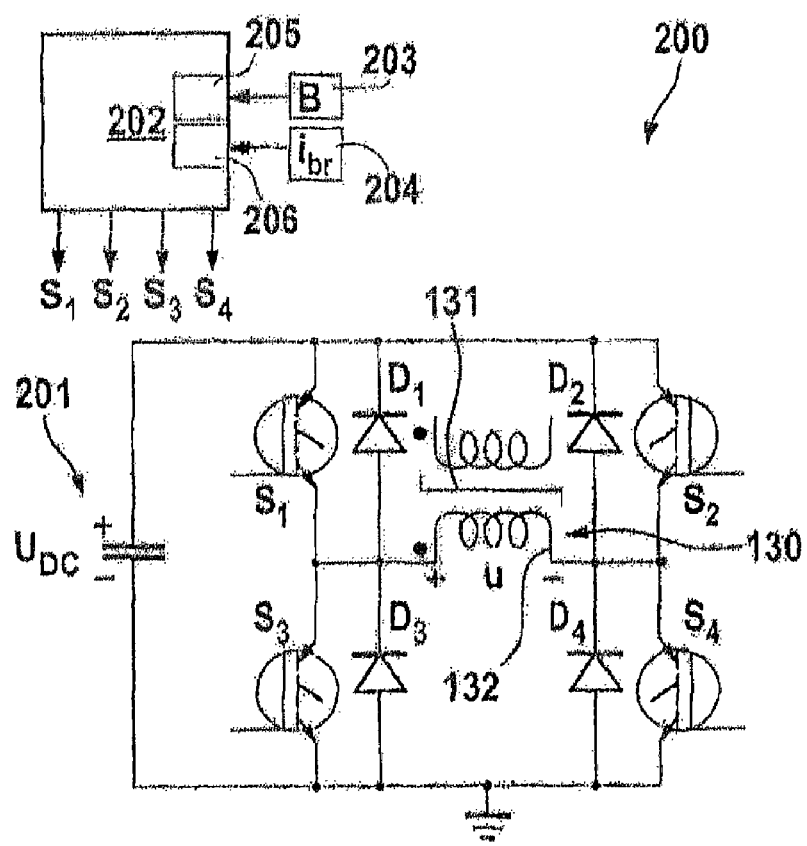
FIG. 2 shows a schematic view of a preferred embodiment of the device according to the present invention.

A preferred embodiment of the device according to the present invention is labeled with reference numeral 200 in FIG. 2. Device 200 includes a dc voltage source 201 which is designed as a mains-supplied rectifier and supplies a dc voltage $U_{DC}$. Moreover, device 200 includes switching means which are designed as transistors $S_1$ through $S_4$ which, when connected appropriately at primary coil 132 of transformer 130, may provide a voltage u having values $+U_DC$, $-U_{DC}$ and 0V. In the embodiment shown, the transistors or switches $S_1$ and $S_4$ are closed in order to apply a voltage $+U_{DC}$ according to the indicated polarity of u, and switches $S_2$ and $S_3$ are closed, in order to apply a voltage $-U_{DC}$. All four switches $S_1$ through $S_4$ are opened in order to apply a voltage of 0V. To protect the switches from becoming damaged, care should be taken not to open switches $S_1$ and $S_3$, and switches $S_2$ and $S_4$ at the same time. Diodes labeled $D_1$ through $D_4$ form a current conduction path in order to prevent voltage spikes when all switches $S_1$ through $S_4$ are opened. On this path, the energy which is present in the transformer may flow into the voltage source. If, e.g. switches $S_1$ and $S_4$ are open, a current flows through primary coil 132. If the switches are closed, a high voltage spike may occur that would damage the transistors if appropriate diodes are not present. If the diodes are present, the current may flow across diodes $D_3$ and $D_2$.

Device 200 includes a control device designed as a microprocessor 202 to control switches $S_1$ through $S_4$. For this purpose, processor 202 includes outputs that are connected to switches $S_1$ through $S_4$ via lines which are not depicted. The device also includes a first determination device 203 for a magnetic flux density B, the value of which is also supplied to microprocessor 202. The device also includes a second determination device 204 for a load current $i_{br}$ in the secondary circuit of the transformer, the value of which is also supplied to microprocessor 202. As mentioned, the determination devices may be designed, e.g. as measuring devices or as arithmetic logic units.

Microprocessor 202 also includes a first comparator unit 205 for comparing the magnetic flux density B that was determined with two specifiable flux density threshold values Bm and −Bm (see FIG. 3), and a second comparator unit 206 for comparing load current $i_{br}$ that was determined with two specifiable load current threshold values $i_{br\text{-}zg}$, $i_{br\text{-}sp}$ (see FIG. 3).

The specifiable threshold values of the magnetic flux density Bm and −Bm, and of load current $i_{br\text{-}zg}$ and $i_{br\text{-}sp}$ may be entered in microprocessor 202 using conventional programming methods, as is known to a person skilled in the art. In typical point welding devices, Bm moves, at approximately 1.5 T, $i_{br\text{-}zg}$ at approximately 13 kA, and $i_{br\text{-}sp}$ at approximately 12 kA. The oscillation behavior of the load current may be influenced via the selection of the two current threshold values.

Switches $S_1$ bis $S_4$ are controlled in order to apply voltages $U_{DC}$, $-U_{DC}$ and 0V of microprocessor 202 based on the comparisons in the manner that will be explained using an example depicted in FIG. 3.

FIG. 3 shows a first diagram 300 and a second diagram 400, in which voltage u at the primary coil is plotted on y-axis 301, magnetic flux density B in transformer core is plotted on y-axis 302, and load current $i_{br}$ in secondary circuit is plotted on a y-axis 303, against time t on an x-axis 304.

The operation of the transformer or the welding device starts at time $t_0$. At this time, voltage $U_{DC}$ is applied to the primary coil of the transformer. As a result, magnetic flux density B in the transformer core increases essentially linearly until it reaches an upper flux density threshold value Bm at a time $t_1$. According to the embodiment of the present invention described herein, the switching means are controlled by the control device in a manner such that voltage $-U_{DC}$ is now applied at the primary coil of the transformer. For simplicity, this control process is described below as "apply voltage". The magnetic flux density in the transformer core continues to drop as a function of time until it finally reaches lower flux density threshold value −Bm at time $t_2$.

Voltage $U_{DC}$ is now applied once more, which causes the magnetic flux density to increase. This process repeats until time $t_4$.

Diagram 400 shows the course of load current $i_{br}$ over time. It is shown that load current $i_{br}$ increases up to time $t_4$ described above. At time $t_4$, load current $i_{br}$ reaches upper load current threshold value $i_{br\text{-}zg}$. As a result, voltage is no longer applied to the primary coil, which results in a drop in load current $i_{br}$ while magnetic flux density B is held constant.

At time $t_5$, decreasing load current $i_{br}$ reaches lower load current threshold value $i_{br\text{-}sp}$, at which point the same voltage is applied that was applied before the voltage was switched off.

As a result, load current $i_{br}$ starts to increase once more, and magnetic flux density B starts to approach lower flux density threshold value −Bm, which it reaches at time $t_6$.

As explained, voltage $U_{DC}$ is then applied in order to drive flux density B back in the direction toward upper flux density threshold value Bm.

At time $t_7$, load current $i_{br}$ reaches upper load current threshold value $i_{br\text{-}zg}$ once more, which causes the applied voltage to switch off until load current $i_{br}$ reaches threshold value $i_{br\text{-}sp}$ once more, at time $t_8$.

Finally, voltage $U_{DC}$ which was applied before the voltage was switched off at time $t_7$ is applied once more, which, in turn, causes load current $i_{br}$ and magnetic flux density B to increase.

The method described above is now repeated for as long as the user wants to operate the transformer or welding device.

The present invention makes it easily possible to operate a transformer essentially without saturation effects or current spikes simply by switching a single dc voltage on, off, or over.

It is understood that only one particularly preferred embodiment of the present invention is depicted in the figures. Any other embodiment is also feasible, in particular one in which other threshold values are provided, in which the circuit has been modified, or which includes a different configuration or number of components, without leaving the scope of the present invention.

REFERENCE NUMERALS

100 Mid-frequency welding system
110 Primary circuit
120 Secondary circuit
130 Transformer
131 Transformer core
132 Primary coil
133 Secondary coil
140 Output region
200 Device
201 dc voltage source
202 Microprocessor
203 first determination device
204 second determination device
205 first comparator unit
206 second comparator unit
300 Diagram
301 y-axis
302 y-axis
303 y-axis
304 x-axis
400 Diagram
B Magnetic flux density
Bm Upper flux density threshold value
−Bm Lower flux density threshold value
D Diode
$i_{br}$ Load current
$i_{br\text{-}zg}$ Upper load current threshold value
$i_{br\text{-}sp}$ Lower load current threshold value
L Coil
N Number of turns
R Resistance
$S_1$-$S_4$ Transistors
u Voltage at the primary coil

What is claimed is:

1. A method for operating a transformer (130) comprising a transformer core (131) having a primary coil (132) and a secondary coil (133) which is connected into a secondary circuit (120), comprising the steps of:
regulating a magnetic flux density (B) in the transformer core (131) between an upper flux density threshold value (Bm) and a lower flux density threshold value (−Bm),
regulating a load current ($i_{br}$) in the secondary circuit (120) between an upper load current threshold value ($i_{br\text{-}zg}$) and a lower load current threshold value ($i_{br\text{-}sp}$),
wherein the steps of regulating the magnetic flux density (B) and the load current ($i_{br}$) include applying, in alternation, a first voltage ($U_{DC}$) and a second voltage ($-U_{DC}$) and a third voltage (0V) to the primary coil (132) of the transformer (130),
wherein the first voltage ($U_{DC}$) and the second voltage ($-U_{DC}$) are direct voltages that are of the same magnitude and opposite polarity and the third voltage (0V) is zero, and wherein the load current ($i_{br}$) increases when any one of the first voltage ($U_{DC}$) and the second voltage ($-U_{DC}$) is applied and, decreases when the third voltage (0V) is applied, to the primary coil (132) of the transformer.

2. A device for operating a transformer (130) comprising a transformer core (131) having a primary coil (132) and a secondary coil (133) which is connected into a secondary circuit (120), comprising:
- a first determination device for a magnetic flux density (B) in the transformer core (131),
- a second determination device for a load current ($i_{br}$) in the secondary circuit (120),
- a first comparator unit (202) for comparing the magnetic flux density (B) that was determined with at least one flux density threshold value (Bm, −Bm),
- a second comparator unit (202) for comparing the load current ($i_{br}$) with at least one load current threshold value ($i_{br-zg}$, $i_{br-sp}$), and
- a control device (202) for controlling, based on the comparisons of switching means ($S_1$-$S_4$), which switching means ($S_1$-$S_4$) includes first connections for a voltage source (u), and second connections for the primary coil (132) of the transformer (130) for applying a first voltage ($U_{DC}$), a second voltage ($-U_{DC}$), or a third voltage (0V) to the primary coil (132) of the transformer (130), wherein the first voltage ($U_{DC}$) and the second voltage ($-U_{DC}$) are direct voltages of the same magnitude and opposite polarity, the third voltage (0V) is zero, wherein a dc voltage source supplies the first direct voltage ($U_{DC}$) and is connected to the switching means ($S_1$-$S_4$), and wherein the load current ($i_{br}$) increases when any one of the first voltage ($U_{DC}$) and the second voltage ($-U_{DC}$) is applied and, decreases when the third voltage (0V) is applied, to the primary coil (132) of the transformer.

3. The device as recited in claim 2, further comprising the voltage source (u).

4. A computer program comprising program code stored on a non-transitory computer readable medium for carrying out the steps of a method as recited in claim 1 when the computer program is run on a computer or an arithmetic logic unit.

5. A computer program product comprising program code which are stored on a computer-readable data storage device for carrying out the steps of a method as recited in claim 1 when the computer program is run on a computer or an arithmetic logic unit.

* * * * *